(12) United States Patent
Lin

(10) Patent No.: US 10,830,867 B2
(45) Date of Patent: Nov. 10, 2020

(54) RADAR UNIT, INTEGRATED CIRCUIT AND METHODS FOR DETECTING AND MITIGATING MUTUAL INTERFERENCE

(71) Applicant: NXP B.V., Eindhoven (NL)

(72) Inventor: Yu Lin, Utrecht (NL)

(73) Assignee: NXP B.V., Eindhoven (NL)

(*) Notice: Subject to any disclaimer, the term of this patent is extended or adjusted under 35 U.S.C. 154(b) by 240 days.

(21) Appl. No.: 16/012,225

(22) Filed: Jun. 19, 2018

(65) Prior Publication Data

US 2019/0056476 A1  Feb. 21, 2019

(30) Foreign Application Priority Data

Aug. 18, 2017  (EP) .................................... 17186942

(51) Int. Cl.
*G01S 7/02* (2006.01)
*G01S 13/34* (2006.01)
(Continued)

(52) U.S. Cl.
CPC .............. *G01S 7/023* (2013.01); *G01S 7/021* (2013.01); *G01S 7/032* (2013.01); *G01S 7/036* (2013.01);
(Continued)

(58) Field of Classification Search
CPC .............. G01S 7/023; G01S 2013/0245; G01S 2013/0254; G01S 13/931; G01S 7/021;
(Continued)

(56) References Cited

U.S. PATENT DOCUMENTS 7,187,321 B2  3/2007  Watanabe et al.
7,263,143 B1*  8/2007  Rothaar ............... H03G 3/3052
                                                    375/345
(Continued)

OTHER PUBLICATIONS

Bechter, J., "Automotive Radar Interference Mitigation by Reconstruction and Cancellation of Interference Component", MTT-S International Conference on Microwaves for Intelligent Mobility, IEEE 2015.
(Continued)

*Primary Examiner* — Olumide Ajibade Akonai

(57) ABSTRACT

A radar unit (400) for detecting an existence of interference is described that includes: a millimetre wave (mmW) transceiver (Tx/Rx) circuit configured support a normal data acquisition mode of operation that comprises transmitting a radar signal waveform and receiving an echo signal thereof; a mixed analog and baseband circuit operably coupled to the mmW Tx/Rx circuit; and a signal processor circuit (452) operably coupled to the mixed analog and baseband circuit. An interference detection unit (448) is operably coupled to the mmW Tx/Rx circuit. The radar unit is configured to operate a time-discontinuous mode of operation that includes a first time portion used as an interference monitoring period and a second time portion used by the radar unit in the normal data acquisition mode of operation, whereby the mixed analog and baseband circuit, signal processor circuit (452) and interference detection unit (448) are configured to detect interference signals during the monitoring period.

16 Claims, 11 Drawing Sheets

(51) Int. Cl.
 G01S 7/03 (2006.01)
 G01S 13/931 (2020.01)
 G01S 13/86 (2006.01)
 G01S 13/42 (2006.01)
 G01S 7/40 (2006.01)
 G01S 13/02 (2006.01)
(52) U.S. Cl.
 CPC ............... *G01S 7/40* (2013.01); *G01S 13/34* (2013.01); *G01S 13/343* (2013.01); *G01S 13/426* (2013.01); *G01S 13/86* (2013.01); *G01S 13/931* (2013.01); *G01S 2013/0254* (2013.01)
(58) Field of Classification Search
 CPC .......... G01S 7/40; G01S 7/032; G01S 7/4021; H04B 7/0617; H04B 17/345; H04B 17/309; H04W 24/08; H04W 16/14; H04W 74/0816; H04W 76/28
 See application file for complete search history.

(56) References Cited

U.S. PATENT DOCUMENTS

| 7,683,827 | B2 | | 3/2010 | Kelly, Jr. et al. |
|---|---|---|---|---|
| 8,223,064 | B2 | | 7/2012 | Szajnowski |
| 8,471,760 | B2 | | 6/2013 | Szajnowski |
| 9,063,213 | B2 | | 6/2015 | Himmelstoss et al. |
| 9,689,967 | B1 | * | 6/2017 | Stark ............... G01S 7/4021 |
| 2004/0027268 | A1 | * | 2/2004 | Langsford ......... G01S 7/2813 342/16 |
| 2004/0066323 | A1 | * | 4/2004 | Richter ............ G01S 13/22 342/70 |
| 2010/0019950 | A1 | | 1/2010 | Yamano et al. |
| 2010/0302969 | A1 | * | 12/2010 | Duenyas ........... H04W 72/082 370/252 |
| 2015/0260828 | A1 | | 9/2015 | Ossowska |
| 2015/0378005 | A1 | | 12/2015 | Kojima |
| 2016/0291130 | A1 | | 10/2016 | Ginsburg et al. |
| 2018/0306901 | A1 | * | 10/2018 | Pernst L ............... G01S 7/021 |

OTHER PUBLICATIONS

Brooker, G., "Mutual Interference of Millimeter-Wave Radar Systems", IEEE Transactions on Electromagnetic Compatibility, vol. 49, No. 1, Feb. 2007.

Dockman, J., " Automotive Radar—quo vadis?", Proceedings of the 9th European Radar Conference, EuMA 2012.

Lu, C., "A mm-Wave Analog Adaptive Array with Genetic Algorithm for Interference Mitigation", IEEE 2012.

Luo, T., "A 77-GHz CMOS Automotive Radar Transceiver With Anti-Interference Function", IEEE Transactions on Circuits and Systems—I: Regular Papers, vol. 60, No. 12, Dec. 2013.

Mu, L., "Research on Key Technologies for Collision Avoidance Automotive Radar", IEEE 2009.

\* cited by examiner

RADAR UNIT, INTEGRATED CIRCUIT AND METHODS FOR DETECTING AND MITIGATING MUTUAL INTERFERENCE

CROSS-REFERENCE TO RELATED APPLICATIONS

This application claims the priority under 35 U.S.C. § 119 of European Patent application no. 17186942.3, filed on 18 Aug. 2017, the contents of which are incorporated by reference herein.

FIELD OF THE INVENTION

The field of the invention relates to a re-configurable architecture for a millimetre wave (mmW) radar unit. The invention is applicable to, but not limited to, a radar unit having an automotive radar sensor configured to detect and mitigate mutual interference and methods therefor.

Background of the Invention

There has been an increased demand for active safety systems for vehicles. Active safety systems require multiple radar sensors per vehicle, each typically working with a specific radar technology. In an automotive application, the radar sensors are mostly built with a few integrated circuits (ICs), or only one IC. The trend is going to Radar system on chip (SoC, using a radio frequency (RF) CMOS process technology) solution for cost and power consumption consideration. Commercial automotive radar sensors typically include multiple receivers and transmitters, implemented as a phased array radar system, in order to improve the output power, receiver sensitivity and angular resolution. The microcontroller (MCU) performs digital control of the transceiver circuits and digital signal processing of the digitized data (e.g. fast fourier transform (FFT), digital signal/system processing), and output processed data to the central CPU of the vehicle.

Radar sensors transmit signals and radar receivers simultaneously receive their echo. The received echo is than mixed with the transmitted signal and results in a low frequency signal having frequency of $fb=f_{receive}-f_{transmit}$ at the output of the mixer, the so-called beat frequency (fb). By analysing the beat frequency, the range parameter (i.e. a distance to targets) can be extracted.

Currently, there are a handful of radar sensor technologies adopted and installed by leading module vehicle manufacturers. Each of these differ in terms of operational principles and typically each radar sensor architecture (and associated radar technology) is supported by a dedicated integrated circuit (IC) set. Furthermore, with the popularization of driving assistance and self-driving systems, it is envisaged that intra-vehicle and inter-vehicle communications, together with radar signals between vehicles, will increase the levels of encountered interference. In particular, it is envisaged that mutual interference will become a big challenge for automotive radar units, especially in urban areas with dense traffic. The interoperability has been identified as one of the major challenges by automotive manufacturers by J. Dickmann, J. Klappstein, H. L. Bloecher, M. Muntzinger, and H. Meinel, "Automotive radar—quo vadis?," in 2012 *9th European Radar Conference,* 2012, pp. 18-21.

Due to the spectrum regulation, all the automotive radar sensors, irrespective of operation types and vendors, are required to work in the frequency range between 76 GHz and 81 GHz, in which 77-81 GHz for short-range, and 76-77 GHz for the long-range radar. The radar unit users have freedom on how to utilize this bandwidth. It is known to divide the Radar frequency band into a number of sub-bands according to the operational modes of the Radar sensor. The total number of the sub-bands may be adaptive and depends on the chirp bandwidth of the radar sensor. For example, when the Radar sensor adopts a mid-range radar (MRR) chirp mode, the 77-81 GHz Radar band can be divided into 8 sub-bands of 0.5 GHz. The Radar operation frequency (the FMCW frequency chirp) can be selected as any one of them.

One interference problem results from several automotive radar units operating in overlapping bands within the same vicinity and with less than perfect antenna radiation pattern. Here, the mutual interference from the other radars may degrade the sensitivity of each other, and even cause false alarms. Sensitivity refers to the ability of the radar to reliably detect objects that produce a weak radar return. The magnitude of the interference depends primarily on the alignment of the radar antennas and the numbers and types of targets within the mutually illuminated region in space. Whether this interference will be interpreted as a target vehicle or a roadside obstacle will depend on the similarities between the characteristics of the two radars and their relative timing, as detailed in G. M. Brooker, "Mutual Interference of Millimeter-Wave Radar Systems," *IEEE Transactions on Electromagnetic Compatibility,* vol. 49, no. 1, pp. 170-181, February 2007. This paper examines the probability that any mmW radar systems will interfere mutually by considering spatial, temporal, and operational frequency-related overlaps. These scenarios are most likely to occur in real driving situations, for example when two radar-equipped cars drive towards each other on a straight road.

Referring now to FIG. 1, a block diagram illustrates a known receiver of a FMCW radar unit 100. The FMCW radar unit 100 includes one or more transmitter antenna(e) 110 coupled to transmitter circuitry and one or more receiver antenna(e) 111 coupled to mmW receiver and signal processing circuits. The transmitter circuitry includes a waveform generator or modulator 102 receiving a radar signal to be modulated for transmission and creating a waveform in response. This baseband waveform is input to a VCO 118 and buffer or frequency multiplier 104 to convert the waveform to a mmW signal. This mmW signal is then passed to a phase modulator 106 and thereafter to a power amplifier 108 before being radiated by the one or more transmitter antenna(e) 110. The mmW receiver (Rx) circuit includes a wideband low-noise amplifier 112, coupled to the one or more receiver antenna(e) 111, where a received radar signal is amplified. The amplified received radar signal is passed to a down-mixer 114, where it is mixed with the high-frequency, frequency synthesizer signal 116 output from the VCO 118. The down-converted received radar signal 120 from down-mixer 114 is input to a programmable baseband circuit 130 that includes a programmable band-pass filter and one or more gain amplifiers (not shown), as well as an analog-to-digital converter (ADC). The digital output 134 from the programmable baseband circuit 130 is input to the digital control and signal processing unit 150 for processing and the received processed (i.e. decoded) radar signal 160 is output. The FMCW radar unit 100 is the most popular operation type in the automotive applications, as it has many advantages over other radar operation type (e.g. higher distance measurement resolution, quick updating, lower peak mitted electromagnetic radiation . . . ).

However, as illustrated in the interference diagram 200 of FIG. 2, such FMCW radar units are susceptible to interference due to the FMCW radar units 100 continuously transmitting across a wide frequency band. This is due to the larger range of frequencies encountered and due to the lower resultant received signal 'peak' power 205, which is overwhelmed by other emissions. Such undesired received emissions include unwanted direct and/or indirect signals 210 from other automotive radars, or unwanted scattered signal returns coming for example from the road-surface or from various objects at the roadside, each contributing to the overall level of interference. This can lead to a substantial increase in the noise floor across part, or all, of the frequency spectrum.

From a circuit implementation perspective, the absence of interference mitigation in conventional automotive radar sensor receivers and radar units results in designs that require high-dynamic-range and power-hungry receiver RF front ends (RFFEs) and analog-to-digital converters. To mitigate strong interference, the RFFE must have sufficient dynamic range (and consequently, power consumption) to prevent strong nonlinearity or saturation of the receiver front-end circuit under interference. Once the radar sensor is jammed by a strong interference, and its receiver circuits are saturated or have to back off the gain in the receiver's analog signal processing chain greatly to accommodate the large unwanted inputs on top of the weak wanted echo signals (in both cases, the sensitivity of the Radar sensor is greatly degraded. Alternatively, for weak levels of interference that only create weak nonlinearities in the analog and RF circuits, it is possible to compensate for these weak levels of interference in the digital domain of the radar unit, e.g. within signal processing unit 150 of FIG. 1, albeit with additional complexity involved.

The mutual interference of automotive radars will become a big challenge and has been identified as one of the major challenges by automotive manufacturers. Referring now to FIG. 3, an example flowchart 300 illustrates a conventional FMCW radar operation with interference-based detection using post digital signal processing of captured data in the normal data acquisition phase whereby bad samples are removed or detected and moved to another spectral band. The flowchart starts at 302 and at system initialization at 304, the radar unit receives commands from a central processor unit with, say, an instruction to operate in a burst or continuous operational mode. The radar unit then configures its internal circuits, e.g. its transceiver circuits, to operate in the instructed mode. At 306, the radar unit enters an 'active' phase, whereby, say, at least the transmitter and receiver antenna arrays are powered 'on' simultaneously and the radar unit starts to transmit and receive radar (echo) signals. The received radar (echo) signals are down-converted, digitized and processed, and in some examples the recovered data is stored in on-chip memory.

Each cycle for a radar unit to transmit and receive radar (echo) signals can have a total duration of 40-60 msec, which consists of a detection phase (data acquisition) and signal processing phase. In the detection phase, which usually lasts 6-20 msec, the transceiver of the radar sensor transmits and receives one or more slow FMCW chirps (in a continuous chirp mode) or many fast FMCW chirps (in a burst chirp mode) simultaneously. The received analog signal is digitized by the ADC, such as ADC 132 in FIG. 1, and digital data is stored in memory. In the signal processing phase, the captured data is processed in main controller unit.

At 308, the radar unit transceiver enters an 'idle' mode of operation, whereby the transmitter and receiver antenna arrays are placed in a low power mode, and a majority of the mmWave/analog Tx/Rx circuits are powered off to reduce power consumption. Here, the main processing unit of the radar unit processes the received digitized signals to detect whether any interference exists. If, at 310, a determination of the level of interference is such that the interference is greater than a threshold, the captured data is discarded at 312 and the process eventually loops back to 306. However, if the level of interference is such that the interference is not greater than the threshold, the processing unit of the radar unit processes the received digitized signals at 314, for example to classify targets and thereafter extracts target data such as range, velocity and direction information. If the radar operation has not been stopped at this point, the process loops back to 306. However, if the radar operation has been stopped at this point, the flowchart ends at 318.

Thus, current interference mitigation techniques use randomization, detect and remove bad samples or detect and move to another spectral band. These current solutions are sub-optimal, particularly in light of the increasing use of vehicular radar technology as well as being unable to mitigate strong levels of interference.

SUMMARY OF THE INVENTION

The present invention provides a radar unit having an automotive radar sensor, integrated circuit and method to detect and a method to mitigate mutual interference, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
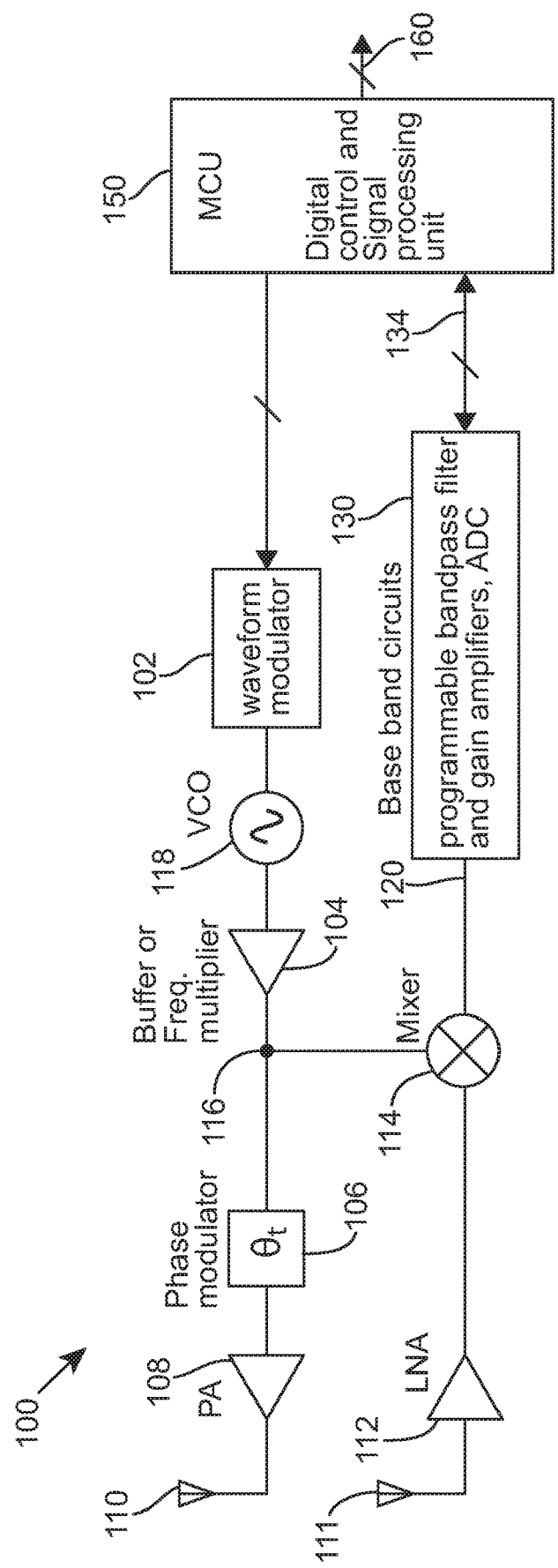
FIG. 1 illustrates a block diagram of a known frequency modulated continuous wave (FMCW) radar unit.
Figure 2:
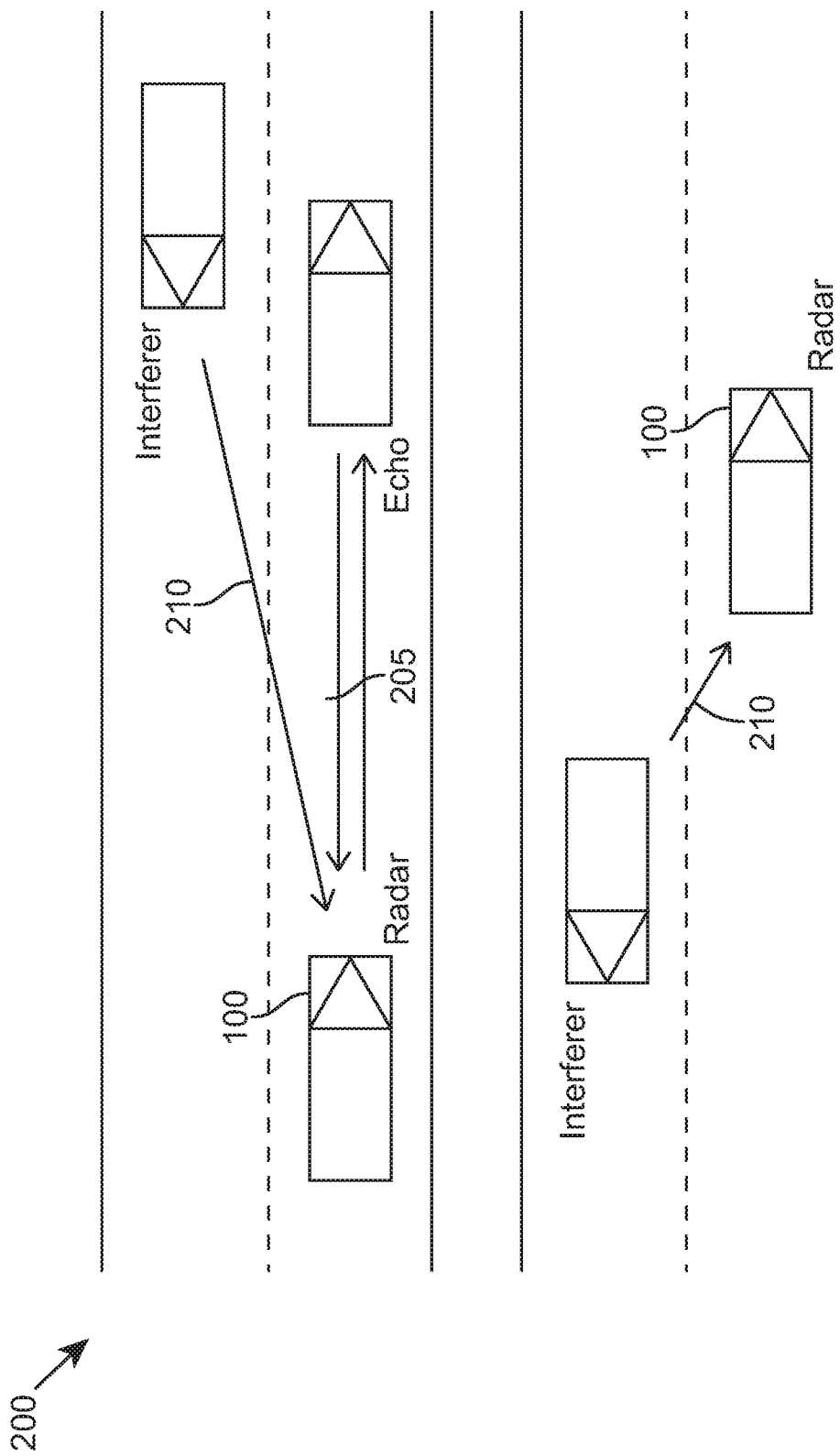
FIG. 2 illustrates an example diagram of a radar unit illustrating examples of how interference may be created.
Figure 3:
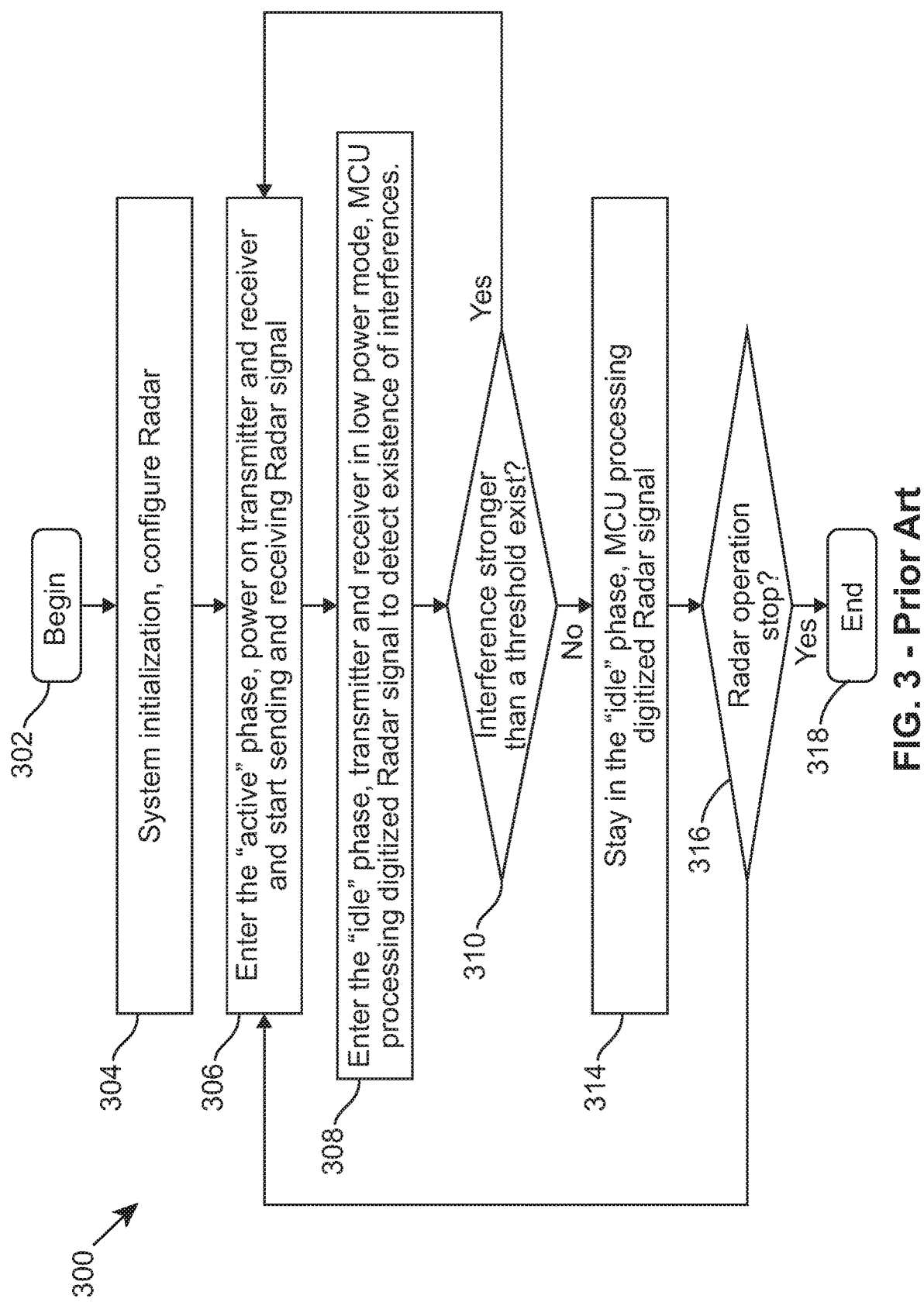
FIG. 3 illustrates an example flowchart of a conventional FMCW radar operation with interference-based detection using post digital signal processing of captured data in the normal data acquisition phase whereby bad samples are removed or detected and moved to another spectral band.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

The inventors of the present invention have recognized and appreciated that it would be advantageous to develop a radar unit design that could detect and mitigate mutual interference in a real-time manner. In some examples, a new architecture is proposed that may avoid interference by means of interference detection and, for example, operation frequency band switching/hopping or spatial filtering mechanisms to mitigate any detected interference. Consequently, when compared to known techniques and architectures, a hardware efficient implementation and operation is proposed that can detect an existence of interference before normal target acquisition techniques are able to.

Thus, in some examples, a radar unit is configured to monitor a whole or a portion of a radar frequency band and/or an arrival direction of any determined interference. In some examples, a radar unit/radar sensor is described that is configured to detect an existence of interference before normal target acquisition is achieved, by scanning a number of operational bands and identifying a direction of arrival of the interfering signal. The monitored interference information may then be used to configure a radar transceiver.

Such early-obtained interference detection information may then be used operate the Radar to transmit and receiver signal in a quieter Radar sub-band, with hopping among between different radar sub-bands. Alternatively, such early-obtained interference detection information may subsequently be used to adjust one or more parameters of a phase array receiver, in order to spatially filter the interference to improve the target detection sensitivity.

This interference information may then be used, in one example, in a configuration of a radar transceiver in a phase array receiver in order to spatially filter or null the interference and thereby improve the target detection sensitivity. In some examples, in response to the interference information and an arrival angle of the interference being identified, this information may also be used to control a transmitter phase array of the radar sensor, to avoid being jammed during normal operation.

Alternatively, the interference information may then be used, in one example, in a configuration of a radar transceiver to assist an operation frequency band switching/hopping operation across different radar sub-bands. When a strong interference is detected, the centre frequency of the frequency chirp may be configured to hop to another frequency in the next chirp sequence. A threshold value in terms of amplitude or noise power could be specified but it depends on how a radar system is implement and sensitivity requirements, it is difficult to give a concrete number. Maybe we can mention just an interference level that is stronger than a predefined threshold value. In some examples, the current radar operation may be halted and the radar transceiver reconfigured. In some examples, the chirp bandwidth (i.e. $=f_{start}-f_{stop}$) and chirp duration (i.e. how fast the frequency changes, which is $(f_{start}-f_{stop})/T_{chirp}$, and sometimes referred to as 'slop'); may also be altered. In some examples, the transceiver phase array may also be adapted to form beam nulls against the direction of the interference, or avoid the main beam is pointing towards the direction of interference. When the main beam is directed towards the interferer, the main lobe (or main beam) is the lobe containing the maximum power when transmitting signals, or achieving maximum gain when receiving signals. It is better to avoid directing the main beam towards the interferer, and as such examples of the invention propose re-directing the main lobe by varying the phase delays in the receiver array units to adjust the direction of the main lobe (or main beam). Alternatively, or additionally in some examples, a gain and/or filter bandwidth of the receiver may be adapted to avoid saturation and/or clipping of an associated analog-to-digital convertor (ADC).

In some examples, an auxiliary detection path, for example incorporating an auxiliary receiver, may be used to obtain the interference signal, with a processor connected to this auxiliary receiver configured to obtain the interference information. In some examples, the auxiliary detection path may include a number of wideband multi-receivers for detecting both frequency and direction of interference signals. In a mitigation context, this information may also be used for controlling the receiver array (in case of a phased array Radar) to steer an antenna beam for spatial filtering/nulling of the interference.

In some examples, the techniques herein described focus on mitigating strong levels of interference, for example as strong interference may be more readily detected by the proposed auxiliary detection path. Advantageously, this additional detection path example may benefit from reduced hardware complexity, in terms of, say, sensitivity, as compared with a normal receiver path. This is in contrast to known techniques for mitigating weak levels of interference, which can be addressed by known signal processing techniques if they are found to cause clipping of the main receiving path.

In some examples, the techniques herein described may provide an interference detection ('listening') phase, which can be inserted before the chirp (i.e. the normal data acquisition) phase. In other examples, it is envisaged that the interference detection ('listening') phase may be performed in parallel with the normal operation to monitor other sub-bands (as illustrated and described with respect to FIG. 9), in order to support the operation frequency band switching/hopping in case the current operation band is jammed.

Figure 4:
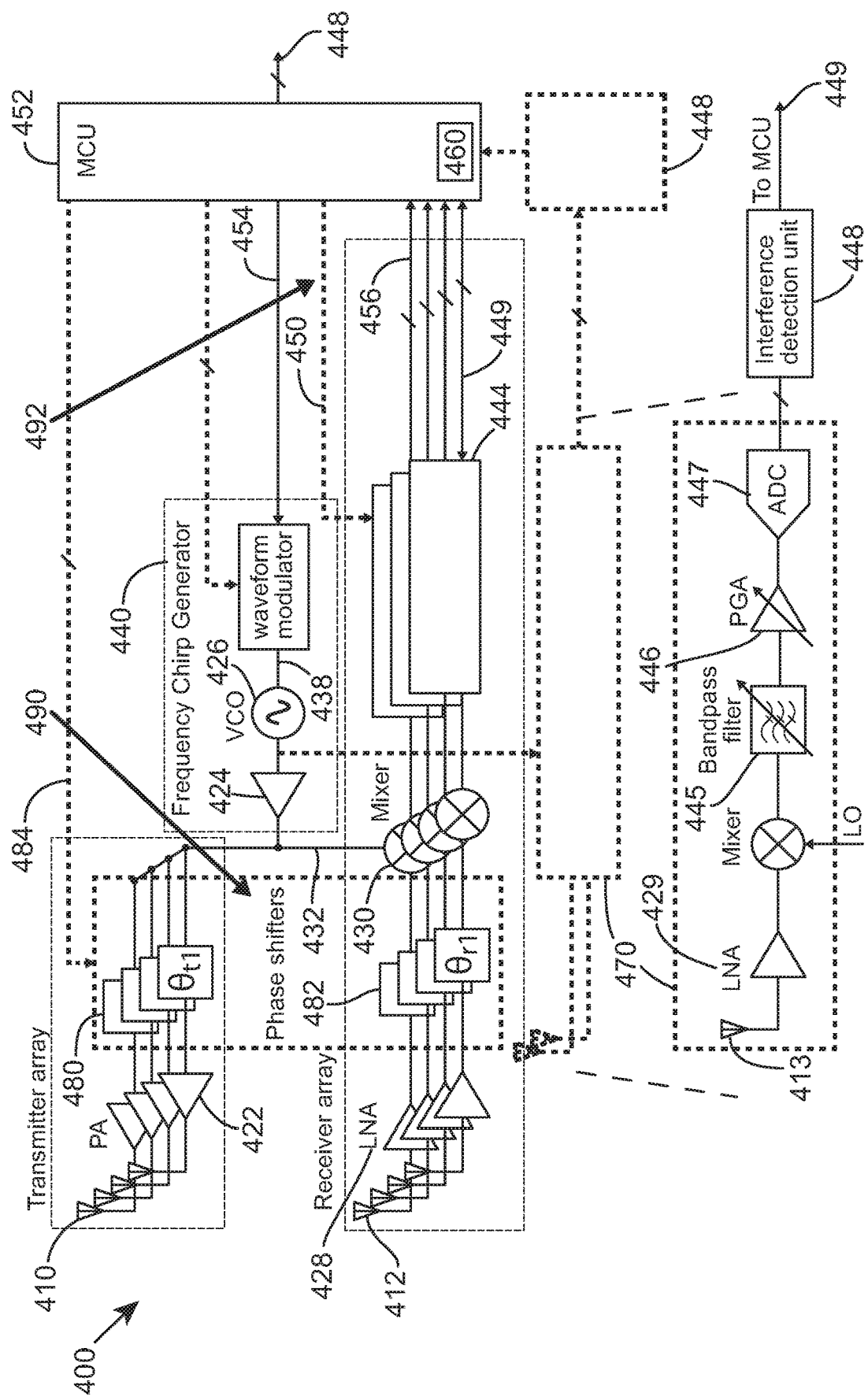
FIG. 4 illustrates a first example block diagram of a radar unit architecture employing a first interference detection mechanism, according to example embodiments of the invention.

Referring first to FIG. 4, a first example block diagram of a radar unit architecture 400 employing a first interference detection mechanism is illustrated, according to example embodiments of the invention. In this example, the radar unit architecture 400 is composed of arrays of transmitters and receivers configured to operate in a frequency modulated continuous wave (FMCW) mode of operation, whereas in other examples (not shown) the radar unit architecture may be composed of a single or a wideband transceiver and/or be configured to operate with other radar modes of operation. Other radar modes of operation may include, for example, pulse mode continuous wave (PMCW), frequency shift keyed (FSK), ultra-wideband (UWB) impulse radar, Pulse Doppler radar. The use of transceiver arrays enables the number of transmitter and receiver channels that can be supported by the radar unit architecture 400 to be scalable.

In a transmitter mode of operation, a microprocessor unit (which may be located in a dedicated processor integrated circuit (IC)) 452 is configured to perform digital control and signal processing that provides a first transmit radar signal 454 to a frequency chirp generator circuit that includes a waveform generator 442 in, say, an analog/mixed signal baseband circuit 440. The waveform generator 442 provides a signal 438 that is to be modulated to a voltage controlled oscillator circuit 426. The modulated signal is then optionally passed to a frequency multiplier 424 (if the voltage controlled oscillator (VCO) generated signal is not at the operating frequency of the FMCW radar unit 400). The high-frequency output 432 of the frequency multiplier 424 is passed to a power amplifier 422, where it is amplified and routed to the one or more transmitter antenna(e) 410.

In a receiver mode of operation, a first received radar signal may be received at the one or more receiver antenna (e) 412 and passed to a low noise amplifier (LNA) 428 where it is amplified. The amplified received radar signal is passed to a down-mixer 430, where it is mixed with the high-frequency signal 432 output from the VCO 426. The down-converted received radar signal 434 from down-mixer 430 is input to a demultiplexer and programmable base band circuit 444, which is controlled by a control signal 450, which in this example is provided by digital control and signal processing unit 452. The demultiplexer and programmable base band circuit 444 implements one or more programmable bandpass filter(s) and one or more gain amplifiers, as well as a highly linear ADC that processes a relative narrow band signal, for example in a range between a few kHz up to 10 to 20 MHz. The demultiplexer and programmable base band circuit 444 outputs a narrowband, high linearity signal 456 to the digital control and signal processing unit 452 for processing and the received processed radar signal 458 is output.

In accordance with examples of the invention, a first interference detection mechanism is implemented by re-configuring one of the receiver paths as a mutual interference detector receiver, including or one or more additional auxiliary detection receiver(s) 470. In examples of the invention, an identification of the interference being caused is the first step to being able to mitigate the effects of the interference. In one example, the one or more additional auxiliary detection receiver(s) 470 may be implemented in the detection path using a wideband receiver configured to cover the complete radar operational bandwidth, and may include one or more of a wideband filter, PGA, and one or more ADCs to facilitate fast scanning of received signals. In this example, a detection path incorporating the one or more additional auxiliary detection receiver(s) 470 does not need to have the same sensitivity as the main radar receiving path (e.g. in FMCW radar, spurs level below −90 dBFS are required to be detected, with a baseband analog bandwidth of only around 10M to 20 MHz). In order to detect strong interference that is able to saturate the main receiving path (for example by clipping the ADC with a signal that is larger than the maximum input range of the ADC), it is envisaged that a lower receiver dynamic range than that of the main path may be accommodated. Thus, the detection path may be designed to have a medium-to-low resolution/dynamic range, say 40 dB to 50 dB lower than the sensitivity of the main receiving path, but with higher baseband analog bandwidth (e.g. 1 to 2 GHz), for example in order to facilitate fast scanning of a whole radar spectrum.

In this example architecture, signals in the 76-81 GHz band are first passed through the antenna 412, 413 and LNA 428, 429 then down converted to below 5 GHz in a mixer 430, 431 by mixing a fixed LO frequency of 76 GHz (e.g. the high-frequency signal 432 output from the Frequency Chirp Generator 440 can be configured to output a fixed 76 GHz LO signal during a detection phase). Thereafter, the wideband baseband signal will be processed by the one or more programmable bandpass filter(s) 445 and one or more programmable gain amplifiers (PGA) 446 and ADC 447 (or in demultiplexer and programmable base band circuit 444 when one of the paths is converted to support interference detection and is further adapted to include an interference detection unit). Subsequently, the digital outputs further processed by an interference detection unit 448 to identify the existence of interference. This approach is more complex than appears, as it requires that the analog bandwidth of the filter and PGA to be greater than 5 GHz and the ADC sample rate to be greater than 10 GS/s (samples per second). The output 449 from the interference detection unit 448 is then passed to the microprocessor unit to analyse, quantify the level of interference and determine a response thereto.

In some examples, it is envisaged that the prevalent radar performance being monitored includes, for example, an existence of any strong mutual interferences (often termed 'jamming') from other radar units operating in the same vicinity. If vehicles in the vicinity are using a same type of radar, with similar types of transmitting waveforms, it is known that they can cause false alarms (so-called 'ghost target') or they may degrade the sensitivity of each other. The detection of interference may be performed, for example, through digital signal processing of the spectrum of the received signal, and by observing a noise floor or tones that exceed a theoretical maximum magnitude, etc.

After the interference has been detected and quantified, it is preferable to avoid or suppress the interference as early as possible in the radar signal processing chain (for example in a radio frequency front-end circuit, or a baseband filter in the demultiplexer and programmable base band circuit 444, before the received signal digitized by an analog-to-digital converter (ADC)) to avoid clipping the ADC and losing useful target information that cannot be recovered in a digital domain of the signal processing. Thus, examples of the invention have been configured to enable interference detection as early as possible, and particularly before the target acquisition step in the radar sensor.

In this manner, examples of the invention thereafter allow the radar unit architecture 400 to be able to mitigate the interference by applying circuit techniques in the 'active' mode, such as tuneable spectral bandpass filtering and/or spatial notch filtering, for example by adapting transceiver coefficients applied in the demultiplexer and programmable base band circuit 444. The radar unit 400 includes a radar interference detector and architecture reconfiguration control unit 460 that receives an indication of interference that the radar unit is subjected to. In this example, it is envisaged that the radar interference detector and architecture reconfiguration control unit 460 is incorporated into MCU 452. However, in other examples, it is envisaged that the architecture reconfiguration control unit 460 may be operably coupled to the interference detection unit 448 and, say, a digital IC (or domain) and configured to respond to the prevalent radar interference levels provided by interference detection unit 448.

Advantageously, this further improves robustness against interference and avoids/reduces the probability of being jammed. This is in contrast to known techniques that detect the interference during the normal radar target acquisition phase and then discard the detection results.

In some examples, interference detection information may be obtained early in the process, and in some instances before normal radar operation is performed. Such early-obtained interference detection information may then be used to assist an operation frequency band switching/hopping technique, with hopping among between different radar sub-bands. Alternatively, such early-obtained interference detection information may subsequently be used to adjust 490 one or more parameters of a phase array receiver, for example by configuring phase shifters 482 in an RF part of the receiver and/or a baseband part 492 of the receiver, in order to spatially filter the interference to improve the target detection sensitivity. This interference information may also be used, in one example, to null the interference by directing a null part of the antenna beam to the direction of the interference, and thereby improve the target detection sensitivity. In some examples, in response to the interference information and an arrival angle of the interference being identified, this information may also be used to control a transmitter phase array of the radar sensor, to avoid being jammed during normal operation.

In some examples, the notch filtering may be performed using steering phased array transceiver (Tx/Rx) antenna beams configured to form 'nulls' in the antenna beams toward the direction of interference.

Figure 5:
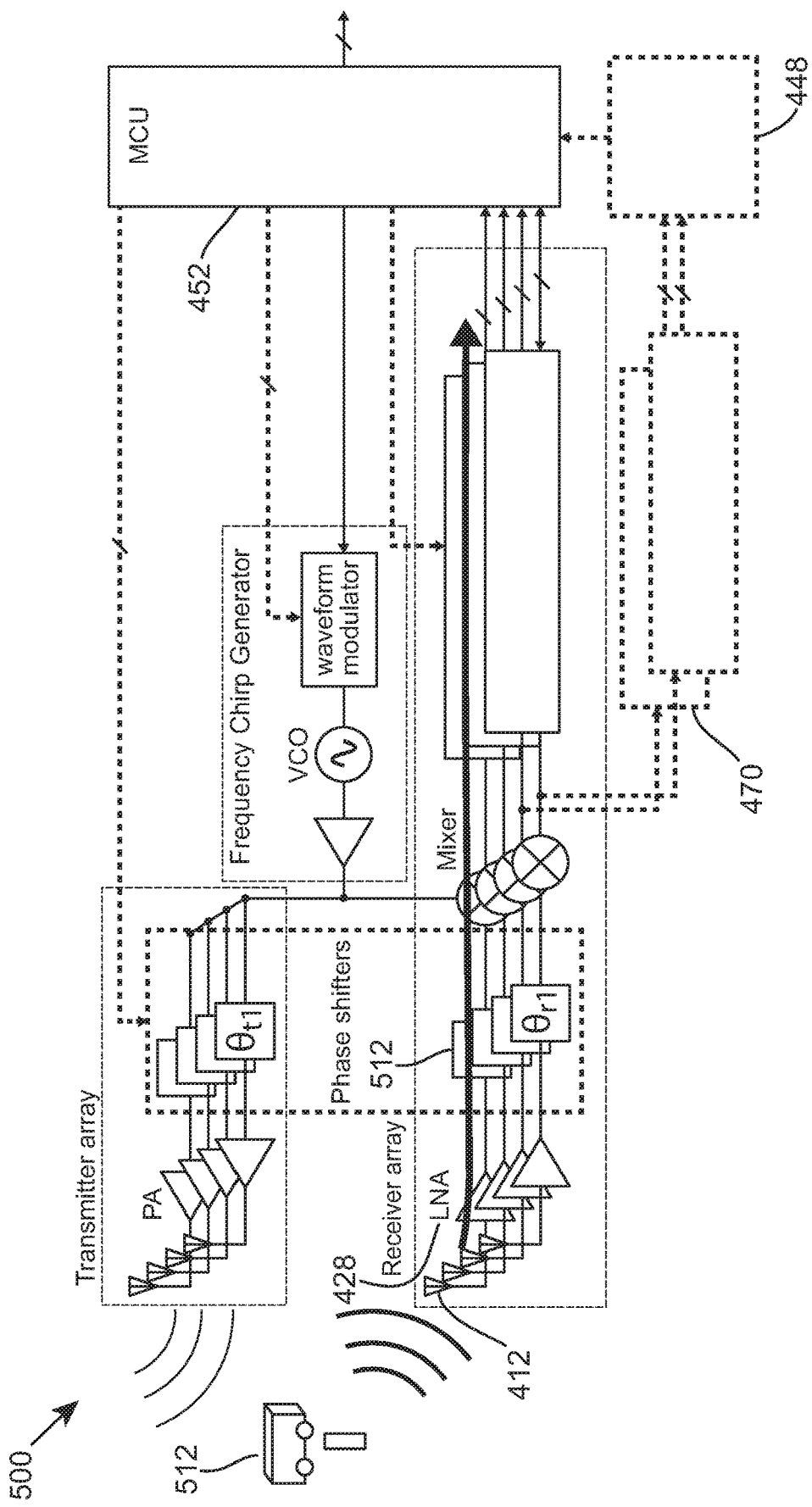
FIG. 5 illustrates an example signal flow diagram of a radar unit architecture, according to example embodiments of the invention.
Figure 5:
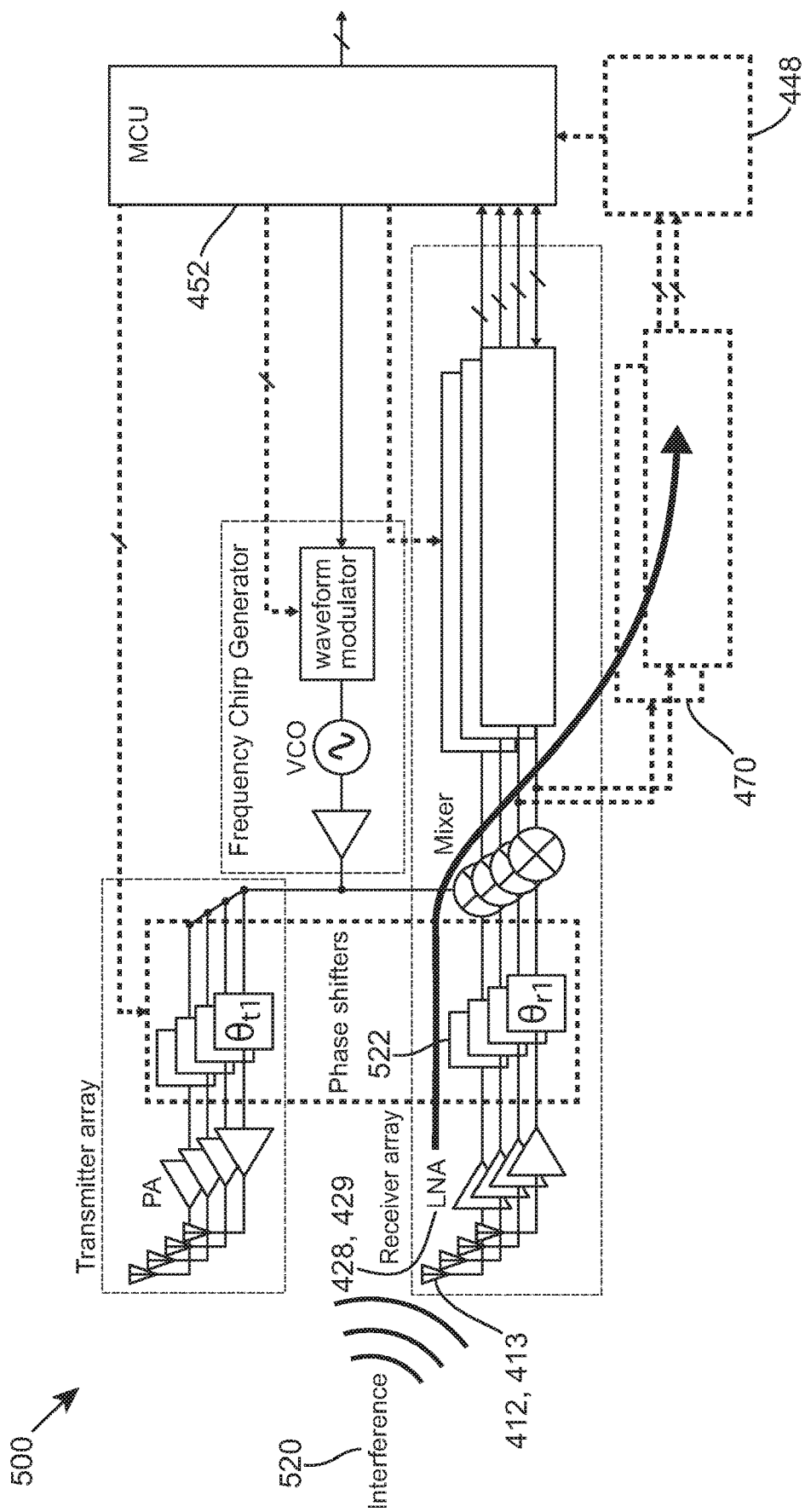
Figure 7:
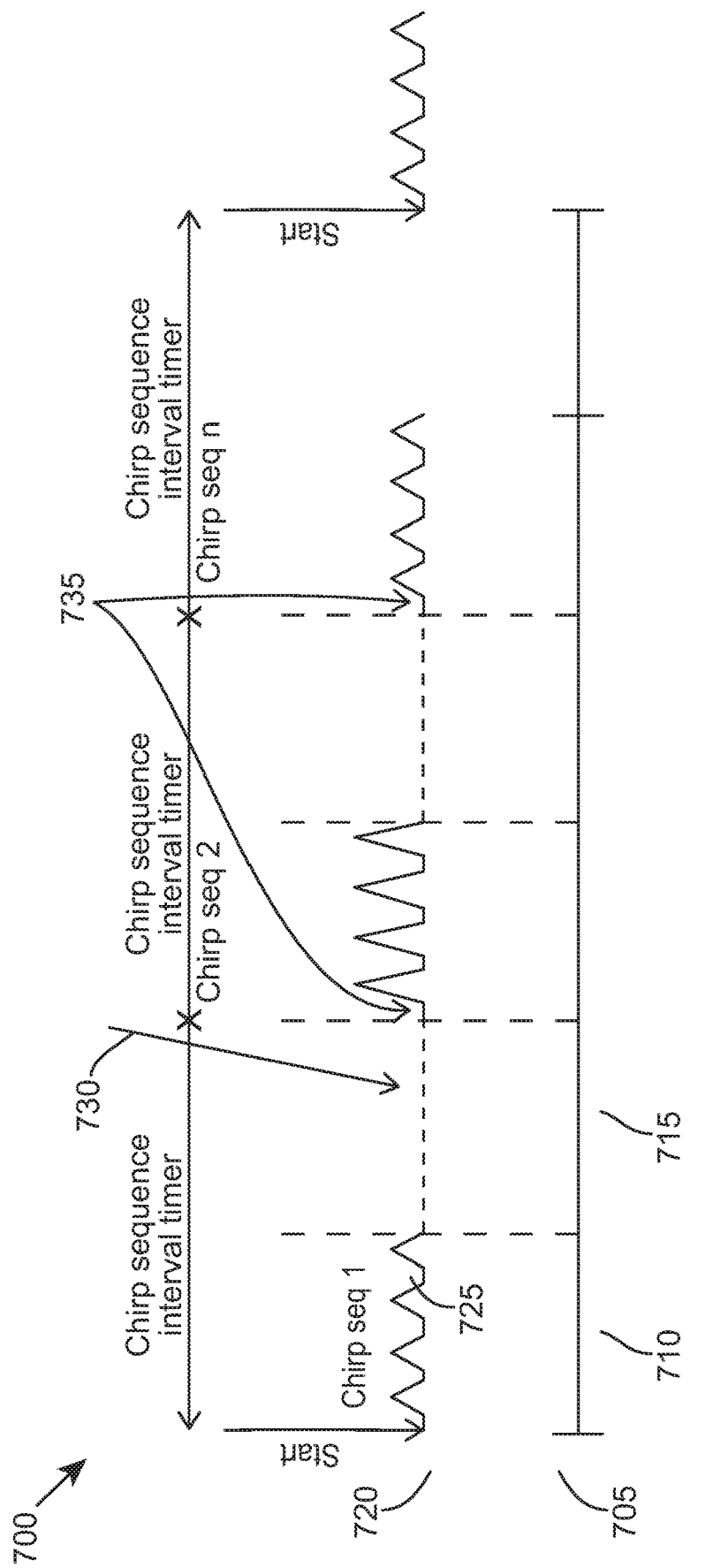
FIG. 7 illustrates an example timing diagram of a second mutual interference detection mode of operation, according to example embodiments of the invention.

Referring now to FIG. 5, an example signal flow diagram of a radar unit architecture 500 is illustrated, according to example embodiments of the invention. FIG. 5 may be viewed as an alternative or improved version of FIG. 4, with some of the hardware (e.g. LNA/mixer, etc.). shared. In a normal receiver mode of operation, a first received radar signal 512 may be received at the one or more receiver antenna(e) 412 and passed to a LNA 428 where it is amplified. This received radar signal 512 is an echo from one or more objects 510 from a corresponding transmit signal. The signal is then down-converted and input to the demultiplexer and programmable base band circuit 444 as described in FIG. 4, A different (second) signal flow path exists for a second received radar signal 522, received in response to an interferer 520 in a detection phase and/or during the normal operation mode. In this example, the two signal flows correspond to two different operation modes, working in a time discontinuous mode of operation, time multiplexing manner, as illustrated in FIG. 7. In an interference detection mode (listen/monitor phase), the transmitter array may be powered off, and, in some examples, the frequency chirp generator may be configured to output fixed frequency signals for scanning different subbands. Here, the interference signal may be received at the one or more receiver antenna(e) 412 and passed to a LNA 428, 429 where it is amplified. As this second received radar signal 522 is identified as a signal from an interference 520, it is then down-converted and input, in this example, to the one or more additional auxiliary detection receiver(s) 470 and interference detection unit 448 for processing, as described in FIG. 4.

Figure 6:
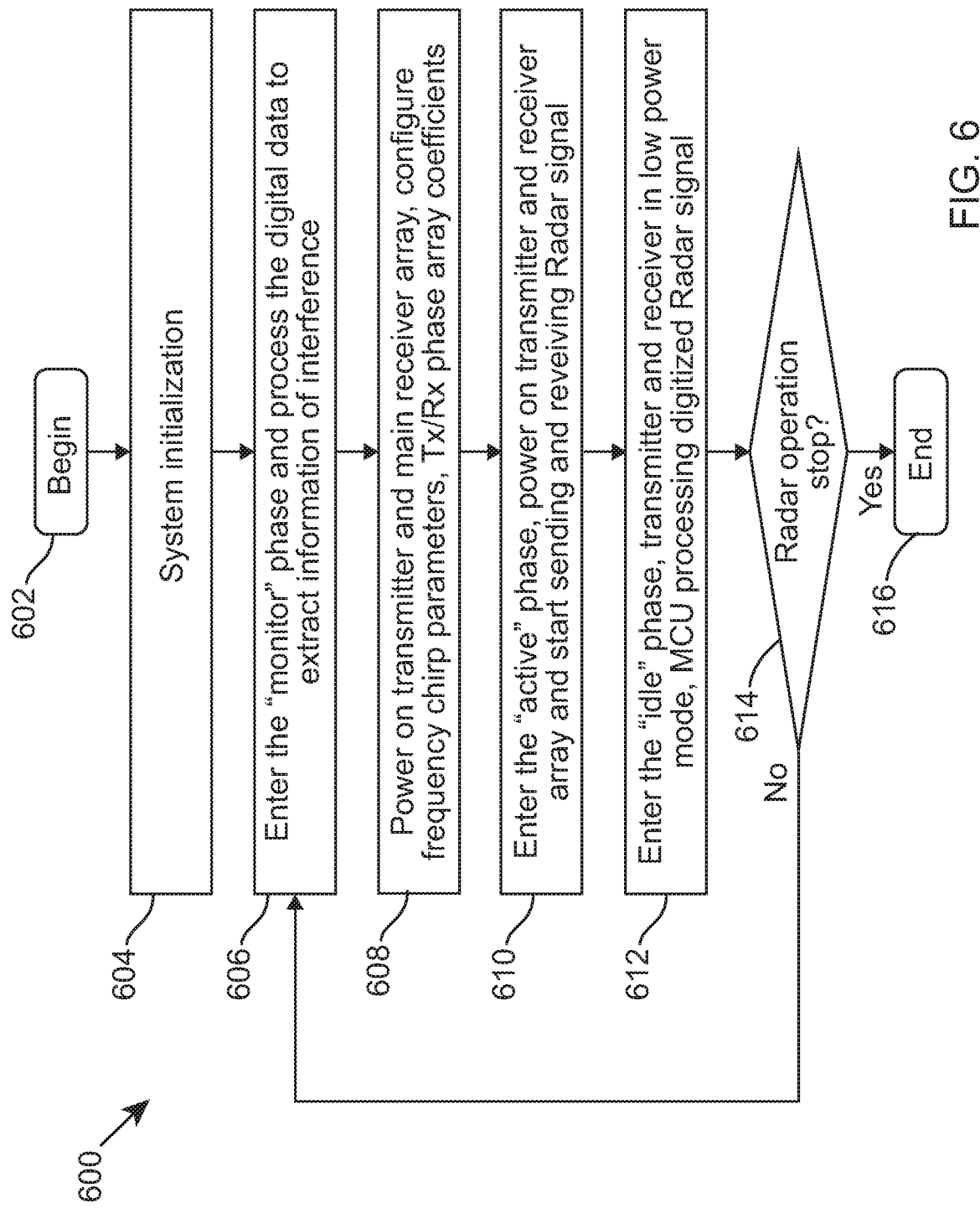
FIG. 6 illustrates an example flowchart of a first operation of a first mutual interference mitigation mode of operation, according to example embodiments of the invention.

Referring now to FIG. 6, an example flowchart 600 of a first operation of a first mutual interference mitigation mode of operation according to FIG. 5 is illustrated, according to example embodiments of the invention. In this flowchart, it is assumed that the radar unit is configured to use the one or more additional auxiliary detection receiver(s) (470) and interference detection unit (448), as described with reference to FIG. 4. Furthermore, in this example, it is assumed that the one or more additional auxiliary detection receiver(s) may be operated in an interference detection mode at any time, and not necessarily limited to a time multiplexed manner, as described later. In this manner, the operation of the example flowchart 600 may be useful in a highly dynamic and traffic congested environment.

The example flowchart 600 starts at 602 and at 604 a system initialization occurs. Here, the radar unit receives commands from the central control unit to operate in either a burst mode, where each measurement contains many repetitive frequency chirp signals (in one sequence) as shown in FIG. 7, or continuous chirp operational mode. At 606, the radar unit (e.g. radar unit 400) enters a monitoring phase, whereby the radar unit powers on only the auxiliary detection receiver(s) and scans preselected radar sub-bands and directions. In this manner, the auxiliary detection receiver(s) down-converts and digitizes received signals and processes the digital data to extract information of interference. At 608, the radar unit powers on its transmitter and main receiver arrays, and configures frequency chirp parameters, transceiver phase array coefficients (e.g. null beam forming, receive baseband filter and gain setting) to avoid and reduce sensitivity degradation of main radar receiver due to strong interference, in response to any identified interference from 606.

At 610, the radar unit enters an 'active' phase, and powers on the transmitter and receiver arrays simultaneously and starts sending and receiving radar signals. In the receive sense, the radar unit down-converts and digitizes received radar signal and stores the data in on-chip memory. At 612, the radar unit enters an 'idle' phase, whereby the radar unit transmitter and receiver are configured in a low power mode. Here, the radar unit MCU processes the received digitized radar signals to classify targets and extract any target(s)' range, velocity, direction information. At 614, the radar unit MCU determines whether the radar operation is stopped. If, at 614, a determination is made that the radar operation is not stopped, the process loops back to 606. If, at 614, a determination is made that the radar operation is stopped, the radar unit is turned off and the flowchart stops at 616.

One drawback of employing one or more additional auxiliary interference detection receiver(s) is that it requires additional complex circuitry and may consume a significant additional silicon area. Thus, some examples of the invention propose a hardware efficient implementation that benefits from a reconfiguration of a normal radar operation, where the inventors have appreciated that there is a long idle time in between two chirp sequences. In one normal operation mode, for example, the chirp sequence may last for 7 msec, and for the remaining 33 msec out of 40 msec of the chirp sequence interval time, the main receiver array is in 'idle' mode. Therefore, there exists an opportunity to reuse the main receiver array for interference detection (activities on the other sub-bands and direction of arrival of interference). Therefore, some examples of the invention describe a second mutual interference detection mode of operation. This second mutual interference detection mode of operation may employ the radar unit architecture 500 as illustrated in FIG. 5, with a signal flow path 512, according to example embodiments of the invention. However, it is proposed that the second mutual interference detection mode of operation operates in a time multiplexed, i.e. the radar unit alternates between the normal radar operation mode (transmit and detection) and an interference detection mode (proposed extra listening operation), as illustrated in FIG. 7.

In this second mutual interference detection mode of operation, existing hardware may be reused, such as the receiver mmWave/analog circuits, whereby these circuits are configured to support multiple (e.g. at least two) operational modes by operating in a time multiplexed fashion. A conventional FMCW radar transceiver operates alternatively between an 'idle' mode (where the transceiver is configured in low power mode with both transmitter and receiver circuits being powered down, and digital signal processing of acquired data being performed) and an 'active' mode (where both transmitter and receiver circuits are powered 'on'). When supporting the second mutual interference detection mode of operation, an interference detection time period is inserted into a radar unit's operational timing. Such an interference detection time period may be employed by radar sensors for monitoring, say, a few preselected sub-bands for an existence and/or strength and/or angle of interference of an interfering signal. In this time multiplexed mode of operation, only the receiver circuits need to be turned 'on' with a dedicated digital signal processing unit. Thus, this operational mode differs from the normal 'active' mode. In some examples, this operational mode may use additional hardware or, in other examples, it may re-configure existing hardware to function differently (e.g. operate using a different bandwidth, a different gain . . . , sweeping down mixing frequencies to cover a number of sub bands and/or adjusting receiver active beam directions).

Referring now to FIG. 7, an example timing diagram 700 of the second mutual interference detection mode of operation is illustrated, according to example embodiments of the invention. In FIG. 7, the x-axis is time 705, the time duration allocated for chirp 710 and idle phases 715 may be user defined parameters. The y-axis 720 is the frequency, where each chirp will linearly ramp 725 from a predefined starting frequency value, e.g. 77 GHz, and end at an another frequency, e.g. 77.6 GHz; the difference of these two values is called the chirp bandwidth (BW); and where each chirp sequence does not necessarily have the same starting and ending frequency values 735. In this time multiplexed mode of operation, effectively, a time slot is inserted 730 in order for the radar unit to monitor the channel, by re-configuring the radar transceiver chirp frequency range or slop, etc. Furthermore, in order to realize the insertion of a monitoring time slot/period in between two chirp sequences, the baseband circuits in each receiver channel may be re-configured to tune the passband to cover different radar sub-bands.

Thus, in this example, a burst chirp mode of operation is implemented. Furthermore, instead of monitoring the whole radar operation band at any particular point in time, the total frequency band (76 GHz-81 GHz) may be divided to a number of sub-bands (N). Thereafter, in one example, the bandpass filter may be controlled in order to pass receiving signals in only one, or a few, sub-band(s) at a time to the PGA and ADC, such as bandpass filter 445, PGA 446 and ADC 447 in FIG. 4. In this manner, the whole radar frequency band may be scanned in a few cycles in one detection phase, thereby greatly reducing the sampling rate requirement of the ADC to 10 GHz divided by 'N' (e.g. N can be programmably configured to be, say, 10 or even 20) in order to detect an existence of interference across all potentially occupied frequency bands.

In a further optional example, it is envisaged that a hardware and power efficiency may be achieved. In this further optional example, there is no need to scan all the 'N' sub-bands in every interference detection phase. Instead, two or three candidate sub-bands to be monitored may be pre-selected or dynamically selected in order to achieve a similar goal, whilst greatly reducing the scanning duration and reduce power consumption. In the 'monitoring' phase, it is envisaged that, in this example, the frequency chirp generator may be configured to generate a set of fixed frequencies, instead of a frequency chirp. These fixed frequencies correspond to the center frequency of each sub-band to be monitored.

Figure 8:
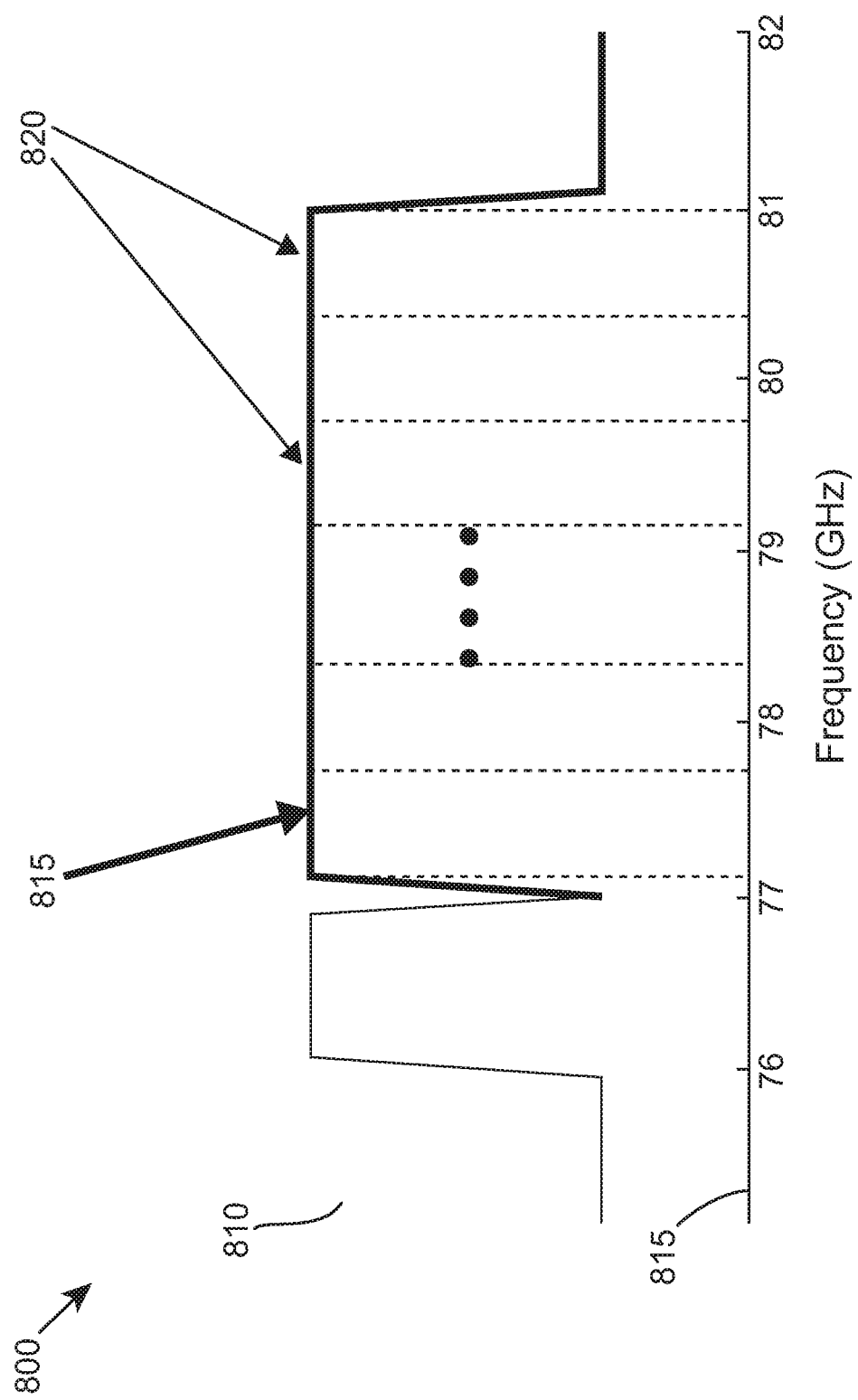
FIG. 8 illustrates a channel frequency diagram for selecting channel sub-bands, according to example embodiments of the invention.

FIG. 8 illustrates a channel frequency diagram 800 for selecting and implementing an operation frequency band switching/hopping between channel sub-bands, according to example embodiments of the invention. The channel frequency diagram 800 includes frequency 805 along the x-axis and the spectral output per sub-band 810 identified along the y-axis. In some examples, when a sub-band that the main radar unit is configured to operate on 815 is identified as being jammed by a strong interference, then it is envisaged that the main radar unit may be configurable to switch/hop to operate in one of the other candidate sub-bands 820 where it is identified that interference is not present, before starting a normal target detection and ranging ('active') mode of operation. The number of candidate sub-bands being monitored and the selection of sub-bands can be determined by the MCU, or in some examples a central computing unit (CPU) of the vehicle which in some examples may be configured to analyse data from other environmental sensors, such as a camera, Lidar, car to car/infrastructure communication (V2X), including other radar units equipped in the same vehicle and so on . . . ) in order to define an optimal low number of candidate sub-bands that have low probability of being jammed. Thus, when the preselected operation band 815 is corrupted by strong interference, the radar sensor operation band in the coming chirp sequence can be changed to a quieter or less corrupted sub-band 820 for improving the detection performance. In some examples, in addition to switching the operational frequency to a quiet sub-band, it is envisaged that the radar unit may be additionally or alternatively configured to control a phased array system to form a 'null' against the direction of the interference in order to further improve the sensitivity of the system and as illustrated in FIG. 11.

Figure 9:
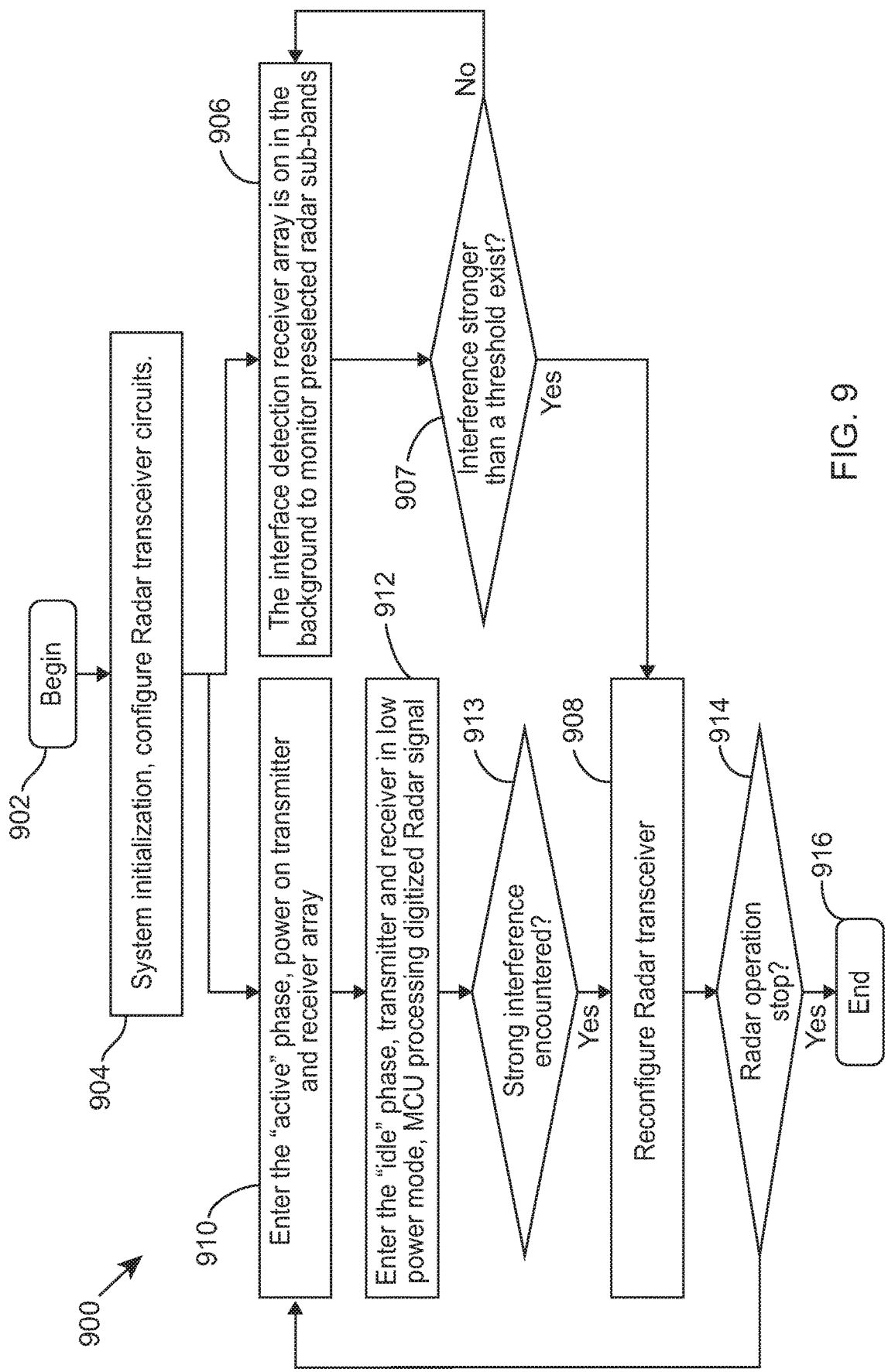
FIG. 9 illustrates a first example flowchart of a second mutual interference mitigation mode of operation, according to example embodiments of the invention.

FIG. 9 illustrates a first example flowchart of a second mutual interference detection and mitigation mode of operation corresponding to the circuit of FIG. 4, according to example embodiments of the invention. At 902, a second mutual interference detection and mitigation mode of operation starts and, at 904, system initialization is performed. Here, for example, the central control unit issues commands to configure the radar transceiver circuits to operate in either a 'burst' or continuous operation modes and the processing unit configures the radar transceiver circuits.

In an interference detection mode of operation, at 906, the radar unit is operating in the background to the normal operation. Thus, in this example, the radar unit employs at least one additional interference detection receiver. This additional interference detection receiver allows the radar channel monitoring to be performed at any given time (as it operates in the background). As such, this example does not need to be time multiplexed with the normal radar target acquisition mode, as illustrated in FIG. 7.

Here, the radar units is operating in a monitoring phase, where the radar unit, for example, powers on only the interference detection receiver array and scans preselected radar sub-bands and received signal directions, down-converts and digitizes the received signals and processes the digital data to extract information of interference. At 907, a determination is made as to whether the interference is stronger than a threshold? If the interference is not stronger than a threshold at 907, the flowchart loops back to 906. If the interference at 907 is stronger than a threshold, then the flowchart moves to 908.

At 908, the radar unit reconfigures the radar transceiver, for example by evaluating the interference detection outputs of both 913 (in-band, current operation frequency band) and 907 (other frequency bands) in order to avoid and reduce sensitivity degradation of main radar receiver due to strong interference.

In an interference mitigation mode of operation, at 910, the radar unit enters an 'active' phase, whereby it powers 'on' the transmitter and receiver array simultaneously and starts sending and receiving radar signals, down-converts and digitizes received radar signals and stores the data in on-chip memory. At 912, the radar unit enters an 'idle' phase, and configures the transmitter and receiver circuits to operate in a low power mode, where the MCU is configured to process digitized radar signals to classify targets and extract targets range, velocity, direction information, etc. The processing unit outputs a target data ready signal. Next, at 913, a determination is made as to whether a strong interference is detected whilst in an active mode. If a strong interference is not detected, at 913, the process loops to 914. If a strong interference is detected, at 913, the process moves to 908, which is then followed by 914.

At 914, a determination is made as to whether the radar operation is stopped. If, at 914, a determination is made that the radar operation is not stopped, the process starts the next chirp sequence and loops back to 910. If, at 914, a determination is made that the radar operation is stopped, the flowchart stops at 916.

Figure 10:
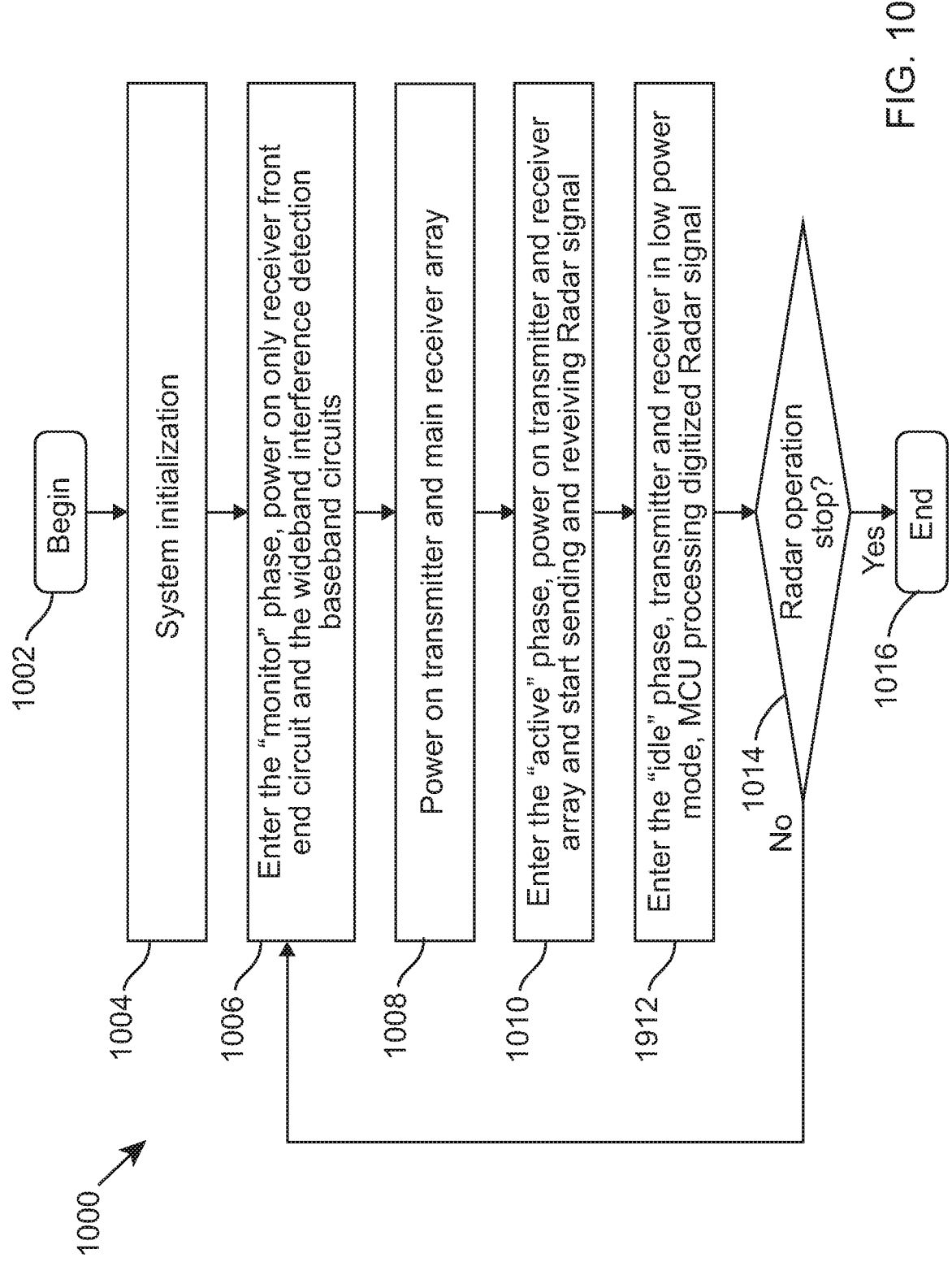
FIG. 10 illustrates a second example flowchart of a second mutual interference mitigation mode of operation, according to example embodiments of the invention.

FIG. 10 illustrates a second example flowchart of the second mutual interference detection and mitigation mode of operation, according to example embodiments of the invention. The second mutual interference detection and mitigation mode of operation starts at 1002 and at 1004 system initialization occurs. Here, the central control unit issues commands to configure the radar transceiver circuits to operate in either a 'burst' or continuous operation modes. At 1006, the radar unit enters the monitoring phase, where the radar unit powers on only the receiver front-end circuit and a wideband interference detection baseband circuit, configures the frequency chirp generator to output fixed frequencies at a time, scans preselected radar sub-bands and directions, down-coverts and digitizes received signals and processes the digital data to extract information of interference. At 1008, the radar unit powers on its transmitter and main receiver array, configures frequency chirp parameters, transceiver phase array coefficients (e.g. null beam forming, receive baseband filter and gain setting) in order to avoid and reduce sensitivity degradation of main radar receiver due to strong interference. At 1010, the radar unit enters an 'active' phase, powers 'on' transmitter and receiver array simultaneously and starts sending and receiving radar signals, down-converts and digitizes received radar signals and stores the data in on-chip memory. At 1012, the radar unit enters the 'idle' phase, and configures the transmitter and receiver circuits to operate in a low power mode, where the MCU is configured to process digitized radar signals to classify targets and extract targets range, velocity, direction information, etc. At 1014, a determination is made as to whether the radar operation is stopped. If, at 1014, a determination is made that the radar operation is not stopped, the process loops back to 1006. If, at 1014, a determination is made that the radar operation is stopped, the flowchart stops at 1016.

In some further examples, it is envisaged that the interference detection receiver may be employed to use a steering phased array antenna main beam in order to locate a direction of incoming signal and gain spatial information of the interferers. In this example, it is envisaged that the radar unit may perform electronical steering of an antenna beam to cover a wide range of directions that an interferer may reside. Once a direction of an interferer is identified, in this example, the MCU of the radar unit may re-configure, using for example control signal 484 in FIG. 4, a phase array detection path in order to scan different frequencies and/or adjust phase array circuits 480, 482 during an interference detection or an interference mitigation mode of operation. For example, the phase array circuits 480, 482 may be composed of multiple, adjustable, parallel/selectable delays, in order to create stronger transmitter and/or receiver active beams, and in some examples create beam 'nulls' in the direction of the interferer. In this manner, using a phased array transmitter, the MCU of the radar unit may adjust the delay/phase difference amongst different paths, and thus the direction of the transmitting signal beam can be adjusted. Similarly, the MCU of the radar unit may adjust the delay/phase difference amongst different paths, and thus the direction of the receiving signal beam can be adjusted by a phased array receiver. The strength of the beam indicates the gain of the antenna.

In summary, known interference detection techniques in radar units use randomization in order to detect and remove bad samples. The interference detection methods are performed in the normal Radar detection phase ('active' mode) and in the radar current operational band (the sub-band in which the radar operates at that moment in time). Hence, known interference detection techniques do not provide any ability for the radar unit to determine an existence of interference in other sub-bands. It is also noteworthy that the known interference technique to detect and remove bad samples loses target information, as the digitalized received signal in the digital domain has already been corrupted by the interference and the captured data in this radar detection phase has to be discarded, as the wanted target information cannot be recovered from the corrupted data. This inability to recover corrupted data is typically due to a much higher noise floor and spurious tone levels, or an inability to distinguish the wanted target data from the interference tones. In extreme cases, there is a possibility that the radar sensor may be continuously jammed (on purpose or unintentionally, when the interferer is relatively stationary to the Radar sensor). In known radar units, the radar sensor is unable to extricate itself from this jammed state and has to keep on discarding captured data, which can lead to a serious safety issue in automotive applications.

In contrast, examples of the invention enable radar units to avoid discarding wanted target information when interference encountered. The ability to adapt and reconfigure the radar unit circuits and the radar unit operation in response to detected interferers can lead to power consumption savings. In addition, reconfiguring the main receiver, rather than using one or more dedicated auxiliary receiver(s), may allow faster detection with wider spectrum and spatial coverage.

In summary, examples of the invention focus on a hardware implementation of a radar sensor that can detect interferences in both the operation frequency band as well as other radar operational sub-bands, as well as a direction of the interference. Furthermore, some examples of the invention propose to use this interference information to allow an operation frequency band switching/hopping of the radar unit among different sub-band or operate the phase array receiver to spatial filter and thereby mitigate the interference.

In some examples, the radar unit may be reconfigured in-situ by the user or the main processor of the vehicle, dependent upon a type of interference or jamming signal that the radar unit encounters, as well as any real-time operational environment that the radar unit detects or is configured for. In mobile vehicle-based radar applications (that will be different from radars used in other applications, for which most of them are stationary), the re-configurability examples herein described support multiple real-life operational scenarios, for example operation in high-speed motorways, and urban areas, with or without a stationary and mobile objects in their vicinity. It is envisaged, in some examples, that the architecture herein described may be used, say as a FMCW where more output power is concentrated in one frequency, so it has a better range performance, but where it may be more susceptible to interference from the same type of interfering radar. The architecture herein described may be used, say, as a PMCW radar when the prevailing operational condition(s) is/are less susceptible to interference, but where there is a lower peak power and a demand for more computational power.

The architecture herein described may be used, say, as a UWB impulse radar, when a good range resolution is desired and where it may be easy to adapt the range resolution by adjusting pulse width. Similarly, the architecture herein described may be used, say, as a UWB impulse radar when it also has a low power consumption and may be needed to provide a wide coverage in azimuth angle but only provide range information (hence it is robust against interference, and is a useful option to use for short distance target detection, such as a parking and stop and go sensor). In some examples, the detection may be performed in the digital domain, by processing the receive signals, and/or assisted by other sensors equipped by the car, e.g. camera, Lidar, etc. In this manner, this reconfigurable radar architecture is able to increase the robustness and safety over known non-reconfigurable radar units, at least for automotive applications.

In accordance with example embodiments of the invention, the architecture reconfiguration control unit 460 has been configured to support multiple radar configurations and radar signal types from a single (or multiple) signal processing unit(s). In some examples, the reconfigurable radar unit that is configurable to support multiple operational modes may be programmed through dedicated software or firmware to support different operational principles. For example, in an urban area with dense traffic, the sensitivity of one particular operation mode may be degraded due to mutual interference of other vehicles. In this situation, the digital signal processor control unit 352 or the vehicle user may reconfigure the reconfigurable radar unit to function in a different operational mode that is less susceptible to the particular type of interference encountered.

Although examples of the invention are described with reference to a radar unit for an automotive safety system, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A radar unit for detecting an existence of interference, wherein the radar unit comprises:
   a millimetre wave transceiver circuit configured to support a normal data acquisition mode of operation that comprises transmitting a radar signal waveform and receiving an echo signal thereof;
   a mixed analog and baseband circuit operably coupled to the millimetre wave transceiver circuit; and a signal processor circuit operably coupled to the mixed analog and baseband circuit;

the radar unit characterized by:

an interference detection unit operably coupled to the millimetre wave transceiver circuit; and wherein the radar unit is configured to operate a time-discontinuous mode of operation that includes a first time portion used as an interference monitoring period and a second time portion used by the radar unit in the normal data acquisition mode of operation, whereby the mixed analog and baseband circuit, signal processor circuit and interference detection unit are configured to detect interference signals during the monitoring period;

wherein the interference detection unit is configured to identify a direction and level of interference of at least one detected interference signal during the monitoring period and output an interference detected signal; and wherein the signal processor circuit is configured to analyse the interference detected signal and quantify a response to the detection;

wherein the radar unit further comprises an architecture reconfiguration control unit coupled to the signal processor circuit and the mixed analog and baseband circuit that comprises at least an amplifier, a filter and an analog-to-digital convertor, wherein the architecture reconfiguration control unit is configured in response to the interference detected signal to adjust at least one of:

a gain and/or filter bandwidth of the mixed analog and baseband circuit to avoid saturation of the analog-to-digital convertor.

2. The radar unit of claim 1 wherein the interference detection unit is configured to detect an existence of interference before the radar unit commences the normal radar target acquisition mode of operation.

3. The radar unit of claim 2 wherein the radar unit only powers on receiver circuits to scan at least a portion of supported radar frequency sub-bands during the first time portion.

4. The radar unit of claim 2 further comprising a waveform generator coupled to the signal processor circuit and configured to generate a frequency chirp sequence waveform during the second time portion of a chirp interval, wherein the time-discontinuous mode of operation is performed in each of a plurality of chirp intervals with a start frequency and an end frequency of the chirps in one chirp sequence being the same, and wherein at least one of the following exists:

where a start frequency and an end frequency of the chirps is different between each chirp sequence; or where a start frequency and an end frequency of the chirps is the same across a plurality of chirp sequences.

5. The radar unit of claim 2 further comprising a waveform generator coupled to the signal processor circuit and configured to generate a frequency chirp sequence waveform during the second time portion of a chirp interval, wherein the time-discontinuous mode of operation is performed in each of a plurality of chirp intervals with a start frequency and an end frequency of the chirps in one chirp sequence being the same, and wherein at least one of the following exists:

where a start frequency and an end frequency of the chirps is different between each chirp sequence; or where a start frequency and an end frequency of the chirps is the same across a plurality of chirp sequences.

6. The radar unit of claim 2 wherein the signal processor circuit re-configures at least one receiver path of multiple receiver paths in the mixed analog and baseband circuit and the millimetre wave transceiver circuit as at least one mutual interference detector receiver.

7. The radar unit of claim 1 wherein the radar unit only powers on receiver circuits to scan at least a portion of supported radar frequency sub-bands during the first time portion.

8. The radar unit of claim 1 further comprising a waveform generator coupled to the signal processor circuit and configured to generate a frequency chirp sequence waveform during the second time portion of a chirp interval, wherein the time-discontinuous mode of operation is performed in each of a plurality of chirp intervals with a start frequency and an end frequency of the chirps in one chirp sequence being the same, and wherein at least one of the following exists:

where a start frequency and an end frequency of the chirps is different between each chirp sequence; or where a start frequency and an end frequency of the chirps is the same across a plurality of chirp sequences.

9. The radar unit of claim 8 wherein the waveform generator is configured to generate a set of fixed frequencies that correspond to a center frequency of each sub-band to be monitored in the first time portion.

10. The radar unit of claim 1 wherein the millimetre wave transceiver circuit comprises a transmitter phase array and in response to the indication of the arrival direction of the detected interference signal, the signal processor circuit is configured to adjust at least one parameter of the transmitter phase array to reduce the level of interference.

11. The radar unit of claim 10 wherein the signal processor circuit is configured to steer an antenna beam of the transmitter phase array to reduce the level of interference.

12. The radar unit of claim 10 wherein the signal processor circuit is configured to steer an antenna beam to perform at least one of:

spatial filtering to reduce the level of interference;

create one or more beam nulls focused towards the direction of the detected interference signal to reduce the level of interference.

13. The radar unit of claim 1 wherein the architecture reconfiguration control unit is coupled to a waveform generator and configured in response to a detected interference signal to adjust at least one of: a chirp bandwidth, a chirp duration, a starting chirp frequency, an ending chirp frequency.

14. The radar unit of claim 1 wherein the signal processor circuit re-configures at least one receiver path of multiple receiver paths in the mixed analog and baseband circuit and the millimetre wave transceiver circuit as at least one mutual interference detector receiver.

15. The radar unit of claim 1 further comprising an auxiliary detection path incorporating at least one auxiliary receiver coupled to the interference detection unit and comprising one or more programmable bandpass filter(s), one or more programmable gain amplifiers, PGAs, and an analog to digital converter, and configured to detect the interference signal.

16. The radar unit of claim 15 wherein the auxiliary detection path includes a number of wideband receivers configured to cover the complete radar operational bandwidth to detect both frequency and direction of interference signals.

* * * * *